(12) United States Patent
Komasara et al.

(10) Patent No.: US 6,240,693 B1
(45) Date of Patent: Jun. 5, 2001

(54) INTERLOCKING AND INSULATING FORM PATTERN ASSEMBLY FOR CREATING A WALL STRUCTURE FOR RECEIVING POURED CONCRETE AND METHOD FOR PRODUCING A FORM PATTERN ASSEMBLY

(76) Inventors: Gary L. Komasara, 79301 Gould Rd., Romeo, MI (US) 48065; Vincent T. Alvaro, 2120 Buell Rd., Oakland Twp., MI (US) 48363

( * ) Notice: Subject to any disclaimer, the term of this patent is extended or adjusted under 35 U.S.C. 154(b) by 0 days.

(21) Appl. No.: 09/322,438

(22) Filed: May 28, 1999

(51) Int. Cl.$^7$ ...................................................... E04B 2/28
(52) U.S. Cl. ............................... 52/439; 52/605; 52/606; 52/604; 52/612; 52/589.1; 52/592.1; 52/592.4; 52/592.5; 52/592.6; 52/582.1
(58) Field of Search ............................ 52/439, 604, 605, 52/606, 612, 589.1, 592.1, 592.4, 592.5, 592.6, 582.1, 530

(56) References Cited

U.S. PATENT DOCUMENTS

| | | |
|---|---|---|
| 2,392,551 | 1/1946 | Roe . |
| 2,749,739 | 6/1956 | Zagray . |
| 3,788,020 | 1/1974 | Gregori . |
| 4,075,808 | 2/1978 | Pearlman . |
| 5,024,035 | 6/1991 | Hanson et al. . |
| 5,123,222 | 6/1992 | Guarriello et al. . |
| 5,459,971 | 10/1995 | Sparkman . |
| 5,465,542 | 11/1995 | Terry . |
| 5,839,243 | 11/1998 | Martin . |
| 6,050,749 | * 4/2000 | Khamis ................................ 405/286 |

* cited by examiner

Primary Examiner—Carl D. Friedman
Assistant Examiner—Christy M. Syres
(74) Attorney, Agent, or Firm—Gifford, Krass, Groh, Sprinkle, Anderson & Citkowski, P.C.

(57) ABSTRACT

An interlocking and insulating form pattern assembly used in creating a wall structure for receiving a poured concrete. A first elongate form structure has a substantially rectangular configuration with a height, a length and a width. The first form structure includes a plurality of interiorly and arcuately formed walls which define in combination a first and second pluralities of interconnecting and vertically and longitudinally spaced and parallel extending concrete filling passageways. Tongue and groove portions are extend from first and second sides of each form structure and at least along selected oppositely facing surfaces so as to provide a stacking arrangement of a plurality of form structures to establish a desired height of the wall structure. The stacking arrangement sets upon a footing and receives a poured concrete to fill the vertically and longitudinally extending concrete filling passageways of the forms. A method is also disclosed for producing a form pattern assembly used in creating the wall structure and includes the steps of extruding an elongate form with a first of the pluralities of concrete filling passageways, as well as the tongue and groove portions for interlockingly stacking the completed form structures. Additional steps include forming, within a height of each of said form structures, a further plurality of concrete filling passageways which extend perpendicular with respect to the first plurality of passageways and which interconnect the pluralities of passageways to provide a general conduit throughout the stackable network of forms for filling with concrete.

21 Claims, 4 Drawing Sheets

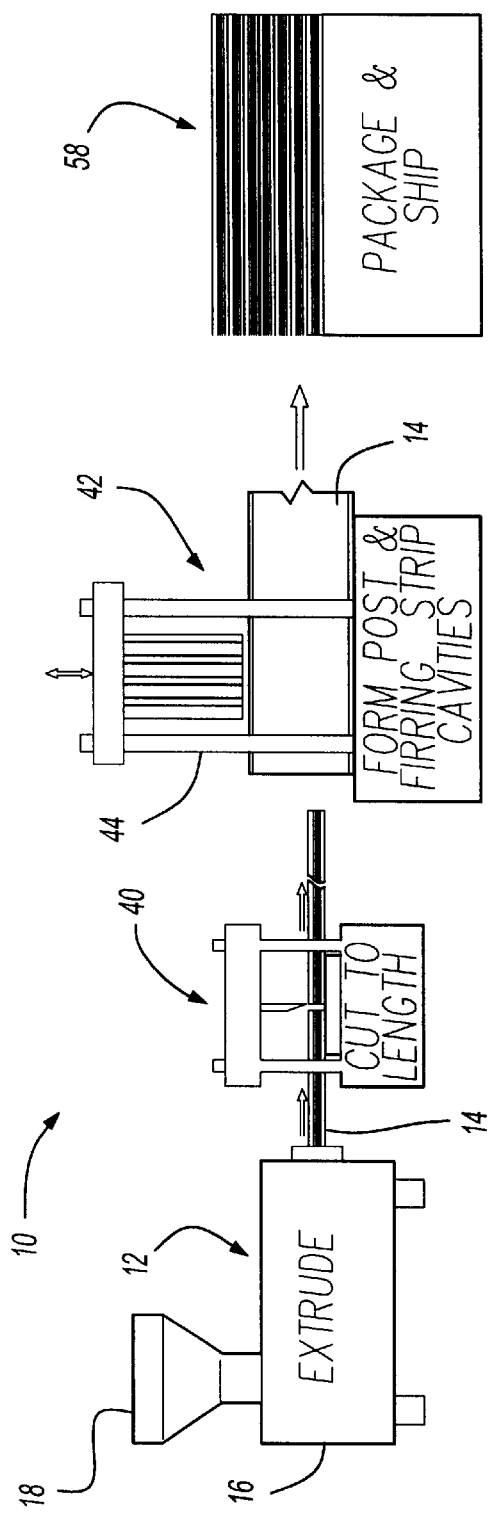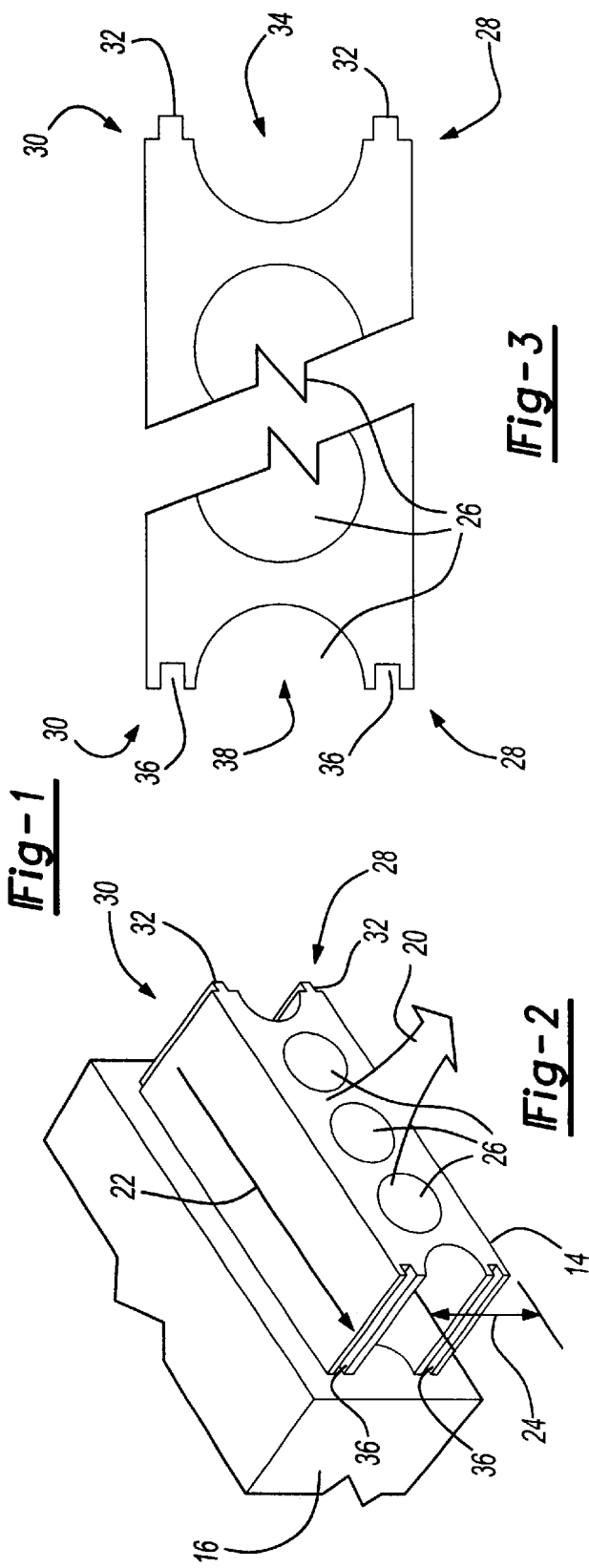

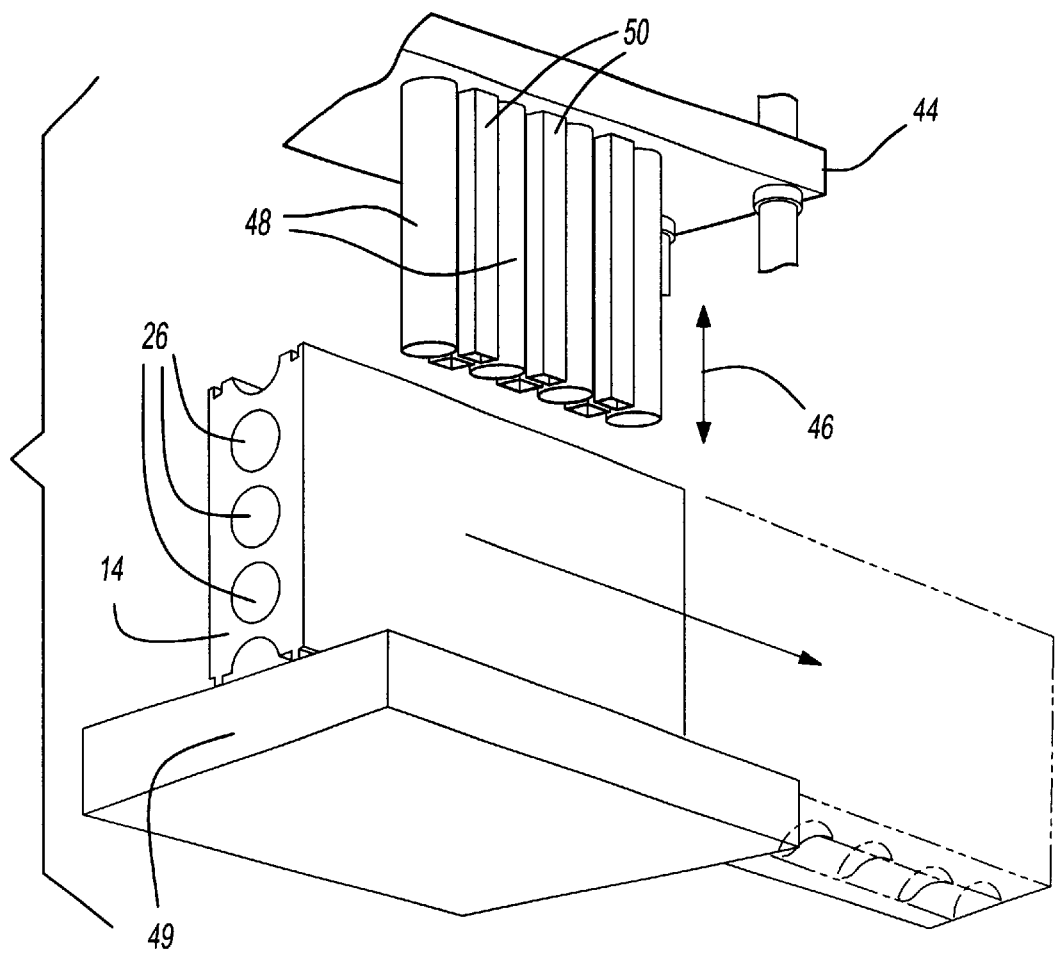
_Fig-4_
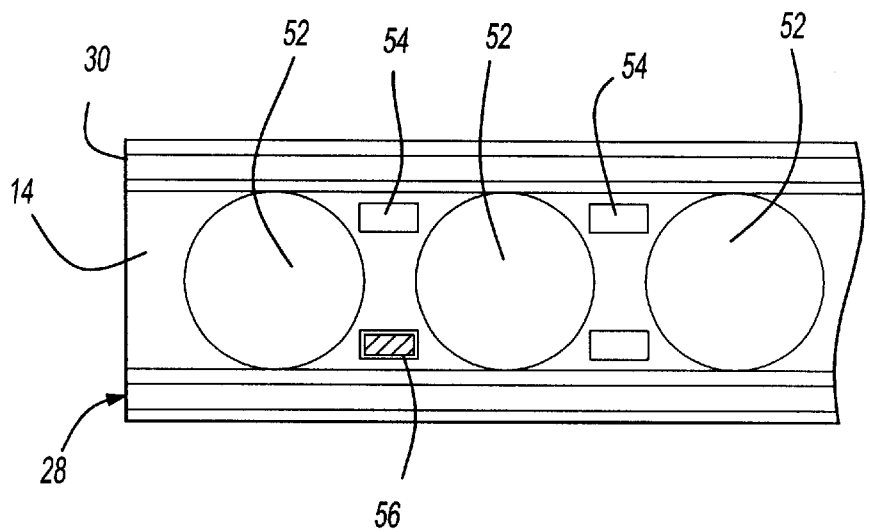
_Fig-5_

INTERLOCKING AND INSULATING FORM PATTERN ASSEMBLY FOR CREATING A WALL STRUCTURE FOR RECEIVING POURED CONCRETE AND METHOD FOR PRODUCING A FORM PATTERN ASSEMBLY

BACKGROUND OF THE INVENTION

1. Field of the Invention

The present invention relates generally to insulating block forms having hollowed interiors which are used in creating a wall structure for receiving a poured concrete. More particularly, the present invention relates to a method for extrusion forming such a block form structure, such method being capable of producing a minimized number of blocks in erecting a typical wall structure.

2. Description of the Prior Art

Traditional building construction has in the past involved the use of cinder blocks formed out of cement which are transported to a job site and are arranged in a standard stacking fashion with the use of building mortar to construct a wall structure. While providing an effective means for constructing a wall, such cinder block assemblies are noted to be fairly highly temperature conductive in that they easily transfer both heat and cold through the wall to the surrounding internal environs. This fact has recently become more appreciated in view of the higher efficiency heating and cooling systems which are now in use.

Over the past several years conventional cinder blocks have been replaced to an extent by highly insulated building blocks constructed out of a plastic or expanded polystyrene. The purpose of such materials is to provide greatly increased thermal insulation or R values to the construction in an attempt to limit the loss of heat and cool air conductivity through the walls of the structure, particularly the foundation. The building blocks have a desired length, width and height and are typically hollowed internally in some desired fashion so that, upon stacking the blocks together, the hollowed internal portions form continuously extending horizontal and vertical channels for receiving a poured concrete. In this fashion, a wall structure can be effectively constructed from the form patterns and the concrete reinforcing added as a final construction step. Examples of such form block structures are illustrated in the art in U.S. Pat. Nos. 5,123,222 and 5,014,480, issued to Guarriello et al., U.S. Pat. No. 5,024,035, issued to Hanson et al., and U.S. Pat. Nos. 4,894,969 and 4,884,382, both issued to Horobin. A further example of an interlocking and insulated form pattern assembly for creating a wall structure for receiving such a poured concrete is illustrated in U.S. Pat. No. 5,839,243, issued to Martin, which teaches such a form pattern assembly which are stackable with the vertically and longitudinally filling passageways and which further includes separate moisture drainage channels extending in interconnected fashion both horizontally and vertically within the form structures so as to provide internal drainage of the form assembly.

SUMMARY OF THE PRESENT INVENTION

The present invention is a novel and improved interlocking and insulating form pattern assembly and method of manufacture for use in assembling a wall structure for receiving a poured concrete. The form pattern assembly includes an elongate form structure having a substantially rectangular configuration with a height, a length and a width. As will be subsequently described in more detail, the form structures provide a specific improvement over such prior art forms in that they are each typically manufactured in an extruding process so as to provide overall heights of either 4 or 6 feet, exclusive of their widths or unlimited overall running lengths, and further, upon being stacked according to a desired arrangement, will facilitate the construction of wall structures ranging from 8 to 12 feet and of generally unlimited lengths.

The form structure includes a plurality of interiorly and arcuately formed walls which define in combination a first plurality of vertically spaced and parallel extending concrete filling passageways. A second plurality of longitudinally spaced and parallel extending concrete filling passageways interconnect with the first plurality of vertically extending passageways and establish an overall conduit network within the associated form structure. Projecting tongue portions extend from first and second sides of each form structure and at least along selected locations of a first surface. Recessed groove portions likewise extend from first and second sides of the selected form structure and at least along selected locations of a second oppositely facing surface. The arrangement of the tongue and groove portions on opposite facing surfaces of each form structure permit an initial form structure to be stacked in aligned fashion upon one or more additional form structures according to a specified arrangement and so that the vertically extending passageways and the longitudinally extending passageways extend continuously throughout the overall stacking arrangement. Additional vertically extending cavities are formed through the form structure proximate the first and second sides. The cavities align upon creation of the stacking arrangement and each is suitable for receiving a fastener engageable and elongate insert for facilitating subsequent attachment of a wall covering surface against a selected side or sides of the wall structure.

The initial row of form structures of the stacking arrangement are set upon a footing and the stacking arrangement completed prior to the wall structure receiving a poured concrete to fill the vertically and longitudinally extending concrete filling passageways. The form structures, and particularly those forming the initial stacked row or those which are configured to correspond with a grading elevation exterior the structure, include a substantially "U" shaped recess formed within and extending along a selected outwardly facing surface of the form structure. An elongate brick ledge insert is provided and includes, in cross section, a first leg and a second angularly extending leg. The brick ledge is affixedly secured upon an upwardly facing shoulder surface of the "U" shaped recess and is suitable for being filled by cement to provide a level surface for a brick ledge for assembling an exterior brick wall.

According to a further preferred embodiment of the invention, a plurality of elongated and plasticized strips of material are secured against an exteriorly facing side of the form structure, and typically the inwardly facing side corresponding with a basement or upper floor of an enclosed structure. The strips are typically secured against the exterior facing surface at spaced apart intervals for facilitating subsequent attachment of drywall or other wall covering surface and provide a potential alternative to the use of the additional vertically extending cavities with fastener engageable and elongated inserts for providing a securing location for attaching the drywall.

According to a further preferred embodiment, a guide is provided for securing a first elongate form structure with a further elongate form structure in end-to-end fashion. The guide in one embodiment defines a generally "I" shape in cross section for receiving in axially extending fashion opposing inserting ends of the elongate form structures. The guide in another embodiment includes first and second spaced and parallel extending surfaces for abutting against oppositely facing surfaces of the form structure. The first and second extending surfaces are interconnected together by assembleable web portions extending therebetween, the web portions defining an end abutting surface between end faces of said form structures. The assembleable variant of the guide permits either axial end-to-end or angled corner location of succeeding form structures.

A method for producing a form pattern assembly is also disclosed according to the present invention and includes the steps of extruding the elongate form structure having a substantially rectangular configuration with a height, a length and a width. The extrusion includes a plurality of spaced apart, parallel extending and elongated concrete filling passageways which are defined by interiorly and arcuately extruded walls extending axially along the running extruded length. The extrusion further includes the formation of the interlocking means upon the first and second sides of the form structure which are provided by opposing tongue and groove portions and which extend along first and second oppositely facing surfaces defining therebetween the height of the form structure. Additional steps include the cutting of the elongate form structure into desired lengths and forming, within the height of the form structure and in a perpendicular direction relative to said plurality of extending and concrete filling passageways, a further plurality of concrete filling passageways which interconnect with the initial plurality of passageways and so as to define the overall interconnecting network upon the stacking assembly of the wall structure.

Yet additional steps include the assembling, in the specified stacking arrangement, of the plurality of the form structures and the step of forming, within the height of each of the form structures, the plurality of cavities proximate to the first and second sides and at spaced relation with respect to the further (or vertically extending) plurality of concrete filling passageways. The cavities align along the assembled and stacking arrangement of form structures such that they are capable of receiving in inserting fashion a fastener engageable and elongated insert for subsequent attachment of the wall covering (or drywall) surface. Also included is the step of forming a substantially "U" shaped recess within and extending along a selected outwardly facing surface of each of the form structures, such as by a hot wire forming process and the subsequent step of Securing upon an upwardly facing shoulder surface of the recess the elongate brick ledge insert for providing a level and brick ledge surface. Finally, also disclosed is the step of securing against a selected side or sides of each of the form structures the plurality of elongated and plasticized strips of material at spaced apart intervals for facilitating subsequent attachment of wall covering surface. As will be subsequently explained in more detail, it is desirable to apply the plasticized strips during the curing and setting process of the form structure to conform the exterior facing and planar surface of the strips to the extent possible with the associated and flush exterior face of the form structure.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an assembly view illustrating the process for producing the form pattern assembly according to the present invention;

FIG. 2 is a partial perspective view of the process illustrated in FIG. 1 and showing in more detail the initial extrusion step for producing an elongated form structure according to the present invention;

FIG. 3 is top view, in reduced section, of the block form structure produced according to the initial extrusion step according to the present invention;

FIG. 4 is a further partial view of the process illustrated in FIG. 1 and showing the formation, subsequent to extrusion, of the further plurality of interconnecting concrete filling passageways and the additional plurality of cavities according to the present invention;

FIG. 5 is a top view of the block form structure produced according to the process step illustrated in FIG. 4;

DETAILED DESCRIPTION OF THE PREFERRED EMBODIMENTS

Figure 6:
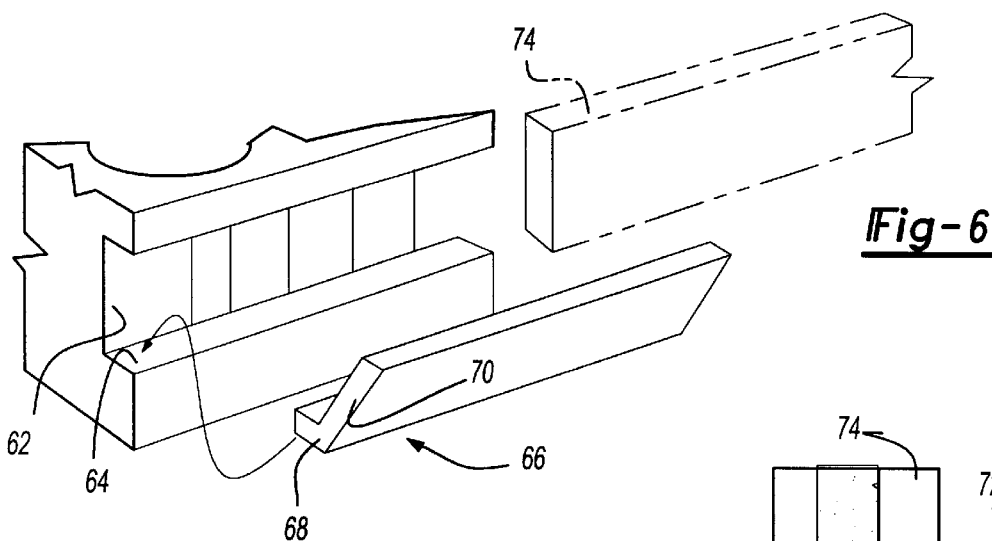
FIG. 6 is a sectional view of a "U" shaped recess extending along the outwardly facing surface of the form structure and the brick ledge insert for securing within the recess according to the present invention.

Referring now to FIG. 1, a method 10 is first disclosed according to the present description for producing a form pattern assembly according to the invention. The present invention teaches both a novel and improved interlocking and insulating form pattern assembly and method of manufacturing a pattern assembly for use in assembling a wall structure for receiving a poured concrete. As will be subsequently described in more detail, the form structures provide a specific improvement over such prior art forms in that they are each typically manufactured in an extruding process so as to be provided in overall heights of either 4 or 6 feet, exclusive of their widths or potentially unlimited overall running lengths, and further, upon being stacked according to a desired arrangement, will facilitate the construction of wall structures ranging from 8 to 12 feet in height and any desired lengths.

The method 10 includes the initial step 12 of extruding an elongate form structure 14, the form structure preferably being constructed of plastic or expanded polystyrene material. As shown in FIG. 1, the extrusion step 12 includes an extruder device 16, according to a conventionally known construction, and a hopper 18 for permitting the introducing of plasticized or polystyrene pellets in mass for use in the extrusion process.

Referring further to FIG. 2, an enlarged view is shown of the form structure 14 formed by the template pattern of the extruder and pressed from the extruder 16 in the direction of arrow 20. The form structure 14 has a substantially rectangular configuration with a height and a width and an adjustable running length. As previously described, the height of each form structure 14 produced (shown by directional arrow 22) is preferably set at either 4' or 6'. The width of the form structure 14 (shown by arrow 24) is typically in the 18" to 24" range.

The initial extrusion of the form structure formed by the template pattern of the extruder includes an initial plurality of spaced apart, parallel extending and elongated concrete filling passageways 26 which are defined by interiorly and arcuately extruded walls extending axially along the running extruded length. The initial extrusion step further includes the formation of the interlocking means upon first 28 and second 30 sides of the form structure 14. The interlocking means are provided in the preferred embodiment by tongue portions 32 which extend along a first pair of the first and second sides 28 and 30 and a selected upwardly facing surface 34. Groove portions 36 extend along a further pair of the first and second sides 28 and 30 corresponding with an opposite and downwardly facing surface 38 (see again FIG. 3). As is apparent from the drawings, the first and second oppositely facing surfaces define therebetween the height of the form structure. The interlocking means provided by the tongue and groove portions permit a plurality of form structures to be assembled according to a desired stacking arrangement as will be subsequently described.

Illustrated at 40 in FIG. 1 is the cutting of the elongate form structure 14 into desired lengths. The machinery illustrated at cutting step 40 is also conventionally known in the art. At 42, the extruded form structure is positioned such that it is rotated ninety degrees and set upon its height 22 within a stamping machine 44. The stamping machine 44 includes a retractable press which moves in a direction along arrow 46 and which includes a first plurality of spaced apart and individual elongate forming portions 48 and a second plurality of spaced apart and individual forming portions 50 (see FIG. 4). The block form structure 14 is preferably in a semi-hardened state during the stamping process and is positioned so that the elongate forming portions 48 are arrayed in generally perpendicular fashion relative to the initial plurality of concrete filling passageways 26 and the downward stroke of the press is then actuated to through the height of the form structure (and to a base 49 upon which the form structure 14 is supported) to create a further plurality of interiorly and arcuately formed extending and concrete filling passageways 52 (see FIG. 5) which interconnect with the initial plurality of passageways 26 and so as to define the overall interconnecting network. The form structure 14 again can be extruded to any desired length, however it has been found that running lengths of 24', 36', 50' or 75' are preferable and so long as the upstanding form structure can be advanced in iterative fashion so that the retractable press of the stamping machine can be reciprocated to form the second plurality of perpendicularly extending and concrete filling passageways 52.

The second plurality of forming portions 50 are optional in the first preferred embodiment and form, through the height of each of the form structures 14, a plurality of cavities 54 which are generally rectangular in shape, offset from the formation of the additional plurality of concrete filling passageways 52, and proximate to the first and second sides 28 and 30. The cavities 54 align, upon subsequent stacking of a plurality of the form structures, such that they are capable of receiving in inserting fashion a fastener engageable and elongated insert (see in cross section at 56 in FIG. 5) for subsequent attachment of a wall covering or drywall surface (not shown). With subsequent reference to FIGS. 8 and 9, a further preferred embodiment will be described for applying a mounting surface, in the form of a plasticized strip, for a wall board or other wall covering material. Referring finally to step 58 of the process of FIG. 1, the form pattern assemblies produced by the present design are packaged and shipped after the form post and firring strip cavity step at 42.

Referring again to FIGS. 1–5, the form structure produced according to the novel process forming a part of the present invention is again shown which includes the first plurality of interiorly and arcuately formed walls which define in combination a first plurality of spaced and parallel extending concrete filling passageways 26 and a second plurality of longitudinally spaced and parallel extending concrete filling passageways 52 interconnecting with the first plurality of vertically extending passageways and establish an overall conduit network within the associated form structure. The projecting tongue portions 32 and recessed groove portions 36 as arranged on opposite facing surfaces of each form structure permit an initial form structure to be stacked in aligned fashion upon one or more additional form structures according to a specified arrangement and so that the vertically extending passageways and the longitudinally extending passageways extend continuously throughout the overall stacking arrangement. As previously described, the additional vertically extending cavities 54 are formed through the form structure 14 according to one preferred embodiment and, upon assembling the stackable wall structure, align with identically configured cavities 54 in the additional form structures so as to receive the fastener engageable and elongate insert 56 for facilitating subsequent attachment of a wall covering surface against a selected side or sides of the wall structure. This is typically accomplished by nailing the drywall or other suitable wall covering surface so that the nails (not shown) pierce the exterior facing surface of the form structure and embed within the insert 56, such insert typically being provided as a semi-rigid plastic or the like and suitable for gripping a piercing nail spike portion.

The initial row of form structures of the stacking arrangement are set upon a footing (see at 60 in FIG. 15) and the stacking arrangement completed prior to the wall structure receiving a poured concrete (not shown) to fill the vertically and longitudinally extending concrete filling passageways. The form structures, and particularly those forming the initial stacked row or those which are configured to correspond with a grading elevation exterior the structure, include a substantially "U" shaped recess formed within and extending along a selected outwardly facing surface of the form structure. The recess is best shown at 62 in FIG. 6 and includes at least an upwardly facing shoulder surface 64. Consistent with the process of manufacture taught by the present invention, the step of applying an appropriately "U" shaped hot wire (not shown) accomplishes the carving out of the "U" shaped recess into the outwardly facing surface of the form structure.

Figure 7:
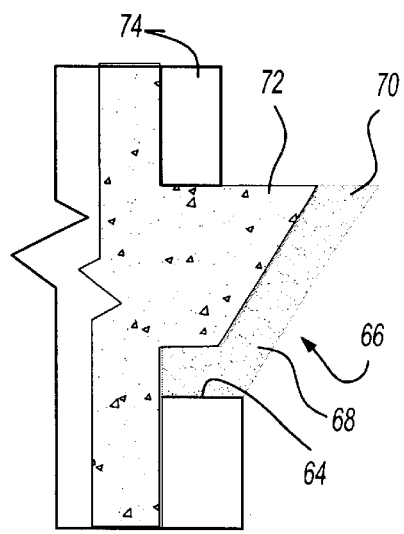
FIG. 7 is a side view similar to FIG. 6 and showing, in cross section, a completed installation of the brick ledge insert with back-filled concrete and an initially installed row of bricks.

An elongate brick ledge insert 66 is provided and includes, in cross section, a first leg 68 and a second angularly extending leg 70. The brick ledge 66 is affixedly secured upon an upwardly facing shoulder surface 64 of the "U" shaped recess, such as is shown in FIG. 7 and with the use of heavy-duty adhesives, fasteners and the like. Once assembled, the trough created by the brick ledge 66 secured to the form structure is suitable for being filled by cement (see at 72) to provide a level surface for subsequent laying a foundation layer of bricks 74 to assemble an exterior brick wall around the enclosed structure.

Figure 14:
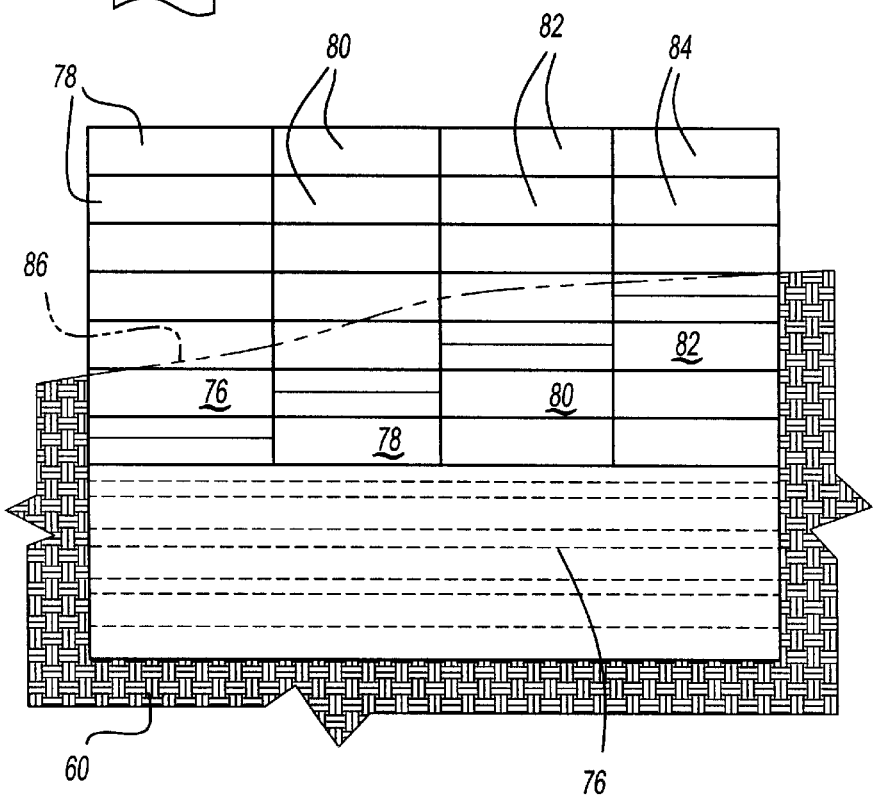
FIG. 14 is a general frontal view in schematic showing an external face of a wall structure with an uneven external grade and with stepped brick ledge inserts.
Figure 15:
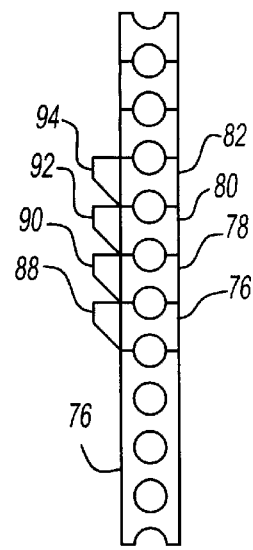
FIG. 15 is a side view of the wall structure shown in FIG. 14 according to the further embodiment of the present invention.

Referring to FIGS. 14 and 15, a further variant of the brick ledge inserts for assembling a brick exterior is illustrated and which is particularly applicable in situations where an uneven external grading is present and for which the brick ledges associated with the form structures must be adapted. Specifically, and referring to FIG. 14, an initial and elongated form structure is illustrated at phantom at 76 set upon the footing 60 and produced according to the process of the present invention. As was previously described, the overall extruded lengths of any desired form structure can extend up to any length desired. A plurality of additional block structures are installed atop the initial form structure 76, and are illustrated as pluralities of blocks 78, 80, 82, 84, and so on. As was previously described, the preferred configuration of each extruded block is that it is provided at an overall height of at least 4' or 6', so that only two or three layers of blocks are typically required for assembling a wall structure. For the purpose of ease of illustration, the additional pluralities of blocks 78, 80, 82, 84, etc., are illustrated in smaller dimension as is contemplated by the art and may conveniently also be only a foot or two in height.

Referring again to the schematic of FIG. 14, the uneven exterior grade is illustrated by phantom line 86 and is particularly common in many home and business landscapes. The ability to accommodate the brick ledge inserts to such a grading is provided by the stackable form structures of the present invention and includes graduated brick ledge inserts 88, 90, 92, and 94 which are placed in stepped arrangement along selected form structures 76, 78, 80 and 82, respectively, and which generally conform to the overall external grade 86. The ability to construct a plurality of individual brick ledges in such an offset arrangement is particularly convenient for assembling the external brick wall in conformance with the exterior grading around the structure.

As is now illustrated in FIGS. 8 and 9, a further alternative embodiment is illustrated for providing a wallboard securing surface in addition or in lieu of the vertical cavities 54 which are formed in the stamping process 42 of the process of manufacture and into which are subsequently inserted the engagement fasteners 56. According to FIG. 8, a specimen of a form structure 14' is illustrated which is produced according to the novel process of the present invention and including the interconnecting pluralities of concrete filling passageways 26' and 52' defined by the arcuately shaped and interior walls, as well as the tongue portions 32' and grooved portions 36' extending from first and second sides of the form structure and along the oppositely facing upper and lower surfaces of each form which defines its overall height and which permits the forms to be stacked one upon the other.

Figure 8:
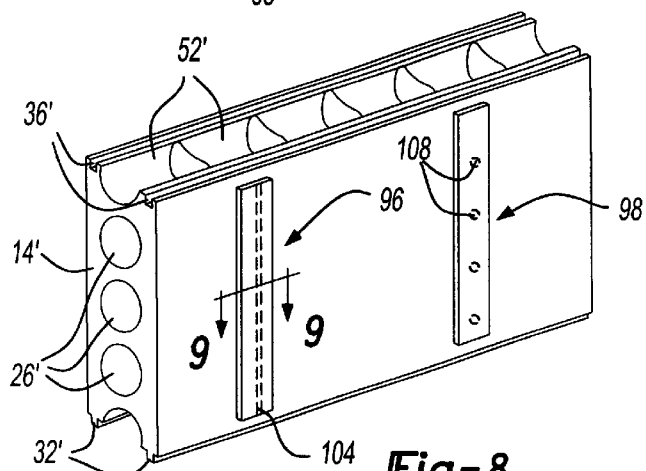
FIG. 8 is a perspective view of a form structure according to a further preferred embodiment and including a plurality of elongated and plasticized strips secured against a selected side or sides of the wall structure.

The novel aspect of FIG. 8 revolves around the substitution of a plurality of elongated and plasticized strips 96 and 98 of material which are secured against an exteriorly facing side of the form structure 14'. Typically the inwardly facing side corresponding with a basement or upper floor of an enclosed structure. The strips 96 and 98 are typically secured against the exterior facing surface at spaced apart intervals for facilitating subsequent attachment of drywall or other wall covering surface (again not shown) and provide a potential alternative to the use of the additional vertically extending cavities with fastener engageable and elongated inserts for providing a securing location for attaching the drywall.

Figure 9:
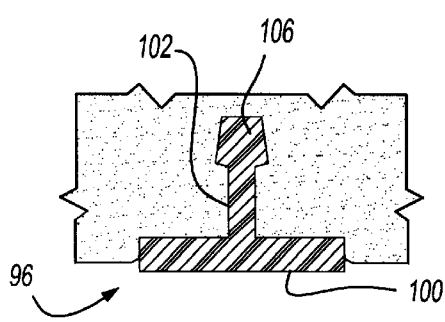
FIG. 9 is a cutaway view taken along line 9—9 of FIG. 8 and further showing, in cross section, the manner of embedding the plasticized strips within the associated side of the wall structure.

Referring to the cutaway view of strip 96 in FIG. 9, it includes a flattened and planar shaped exterior facing surface 100 (within which the nail or screw fasteners of the wall covering are suitable for being engaged) as well as an anchor portion 102 which, according to strip 96, extends continuously the axial length of the strip 96 and which seats within an aligning and interference fitting channel (see in phantom at 104 in FIG. 8). It is desirable to apply the plasticized strips during the curing and setting process of the form structure, and before it has become completely hardened, for the dual purposes of embedding to an extent the exterior facing surface 100 within the surrounding exterior face of the form (see again FIG. 9), as well as resistance fitting the elongate anchor portion 102 within the running channel and causing the enlarged head 106 of the anchor portion to fixedly engage within the channel 104. Referring to the elongated strip 98, the anchor portions can be provided as a series of spaced apart button portions (see in phantom at 108) and which engaged within suitably matching apertures machined into the exterior face of the form structure in the same manner in which the channel 104 may be formed.

Figure 10:
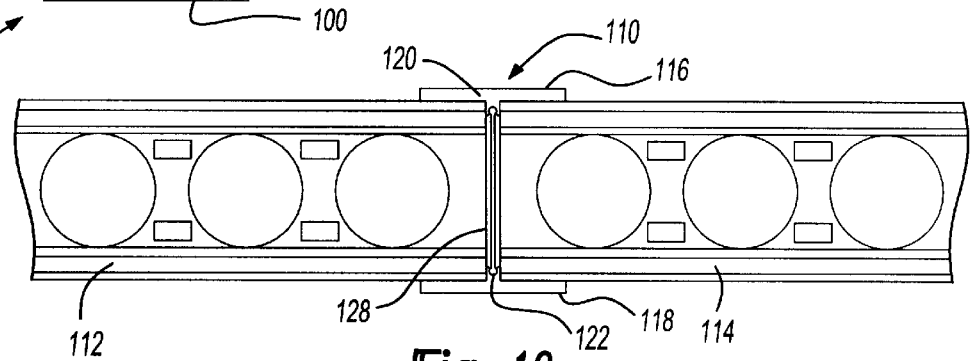
FIG. 10 is a top view of a guide according to a further variant for securing a first elongate form in end-to-end fashion with a further elongate form.
Figure 11:
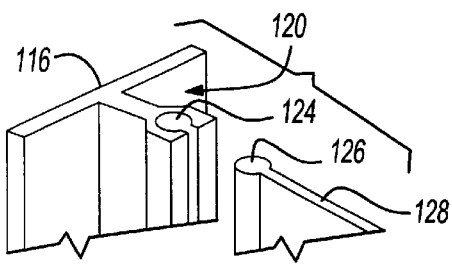
FIG. 11 is partial view, in perspective, of a further variant of the guide which includes first and second spaced and parallel extending surfaces which are interconnected against oppositely facing surfaces of the form structure by assembleable web portions extending therebetween.

Referring now to FIG. 10, a further preferred embodiment is illustrated of a guide 110 which is provided for securing a first elongate form structure 112 in end-to-end fashion with a further elongate form structure 114. The guide 110 in the embodiment of FIG. 10 forms a generally "I" shape in cross section for receiving in axially extending fashion opposing inserting ends of the elongate form structures 112 and 114. As further illustrated by viewing FIGS. 10 and 11 in combination, the guide 110 is separable into a first half and a second half. The first half includes a first parallel extending surface 116 and the second half includes a second spaced and parallel extending surface 118 for abutting against oppositely facing surfaces of the form structure. The first and second extending surfaces 116 and 118 are interconnected together by assembleable web portions extending therebetween. The web portions are illustrated as first connecting portions 120 and 122 extending from reverse faces of the first and second extending surfaces 116 and 118, respectively, the web portion 120 being shown in enlarged section in FIG. 11 and including a circular cross sectional opening which receives a likewise circular shaped trailing edge 126 of a planar interconnecting web 128. The view of FIG. 11 is also representative of the connection between the opposite end of interconnecting web 128 and second extending surface 118 forming the other half of the guide 110.

Figure 13:
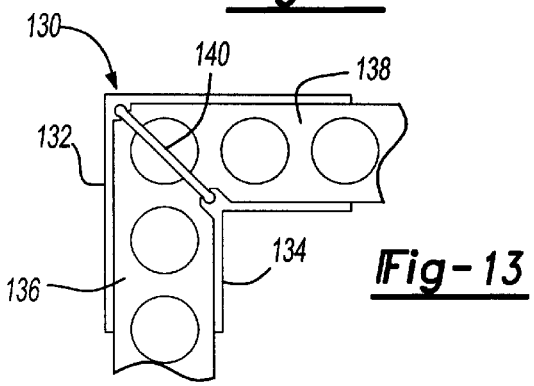
FIG. 13 is a further variant of the guide as disclosed in FIGS. 11 and 12 and illustrating a corner abutting engagement of successive and angularly configured form structures.

Referring to FIG. 13, a similar variation of the guide is illustrated at 130 and which discloses a the first extending surface in a first generally "V" shape 132 and a second extending surface in a second generally "V" shape 134 which is spaced from the first surface 132. As with the variant of FIGS. 10 and 11, the guide 130 is provided for the explicit purpose of aligning an end-to-end connection of succeeding form blocks in particular instances where commercial grade lengths of such blocks are necessary for end-to-end connection. The particular variant of FIG. 13 permits an angled corner connection of first and second form structures 136 and 138 and in which the opposing end faces of the forms are angled to suitably abut against a web 140 interconnecting the first and second "V" shapes together.

Figure 12:
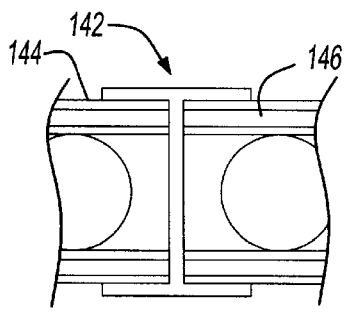
FIG. 12 is a top view, similar to that shown in FIG. 10, and showing a completed assembly of a guide such as disclosed in FIG. 11 and with end-to-end abutting form structures.

Referring finally to FIG. 12, a standard variation of a solid "I" beam shaped guide is illustrated at 142 for securing in end-to-end fashion form structures 144 and 146. The advantage of the assembleable guides 110 and 130 is that they are particularly useful for tight fitting applications where it might otherwise not be possible to place an integrally formed guide. The guide 142 may however be used in any other situation where access is not an issue.

Having described our invention, it will become apparent that it teaches a novel interlocking and insulating form pattern assembly and method of manufacture which is an improvement over the prior art in that it permits the construction of fewer and taller interconnecting blocks and further that it retains the desire for even distribution of poured concrete, and its attendant loading stresses, during filling of the interconnecting network within the assembled form structures. Additional embodiments will become apparent to those skilled in the art to which it pertains without deviating from the scope of the appended claims.

We claim:

1. An interlocking and insulating form pattern assembly used in creating a wall structure for receiving a poured concrete, said form pattern assembly comprising:

a first elongate form structure having a substantially rectangular configuration with a height, a length and a width, said first form structure further including a plurality of interiorly and arcuately formed walls which define in combination a first plurality of vertically spaced and parallel extending concrete filling passageways and a second plurality of longitudinally spaced and parallel extending concrete filling passageways which interconnect with said first plurality of vertically extending passageways;

interlocking means for securing said first form structure in aligned fashion to at least one additional form structure according to a specified stacking arrangement so that said vertically extending passageways and said longitudinally extending passageways extend continuously throughout said stacking arrangement, said interlocking means including projecting tongue portions extending from first and second sides of each said form structures and at least along selected locations of a first surface, recessed groove portions likewise extending from first and second sides of said form structures and at least along selected locations of a second oppositely facing surface;

a plurality of elongated and plasticized strips of material secured against at least one of said sides of said wall structure at spaced apart intervals for facilitating subsequent attachment of drywall, said plasticized strips further comprising a flattened and planar shaped exterior facing surface and an anchor portion extending from a reverse facing surface of said strip and embedding within an appropriate aperture formed within said form structure; and said stacking arrangement of form structures setting upon a footing and receiving a poured concrete to fill said vertically and longitudinally extending concrete filling passageways of said forms.

2. The form pattern assembly as described in claim 1, each of said form structures further comprising additional vertically extending cavities formed therethrough and proximate said first and second sides.

3. The form pattern assembly as described in claim 2, each of said cavities suitable for receiving a fastener engageable and elongate insert for facilitating subsequent attachment of a wall covering surface against a selected side or sides of said wall structure.

4. The form pattern assembly as described in claim 1, further comprising a substantially "U" shaped recess formed within and extending along a selected outwardly facing surface of said form structure.

5. The form pattern assembly as described in claim 4, further comprising an elongate brick ledge insert including, in cross section, a first leg and a second angularly extending leg, said brick ledge being affixedly secured upon an upwardly facing shoulder surface of said "U" shaped recess and suitable for being filled by cement to provide a level and brick ledge surface.

6. The form pattern assembly as described in claim 1, further comprising said anchor portion extending an axial length of said plasticized strip and seating within an appropriately configured channel recess formed along said selected side of said wall structure.

7. The form pattern assembly as described in claim 1, said anchor portion further comprising a plurality of individual and spaced apart anchor portions which seat within appropriately configured apertures formed at predetermined spaced intervals along said selected side of said wall structure.

8. The form pattern assembly as described in claim 1, further comprising a guide for securing said first elongate form structure and a further elongate form structure in end-to-end fashion.

9. The form pattern assembly as described in claim 8, said guide further comprising an elongate member which is substantially "I" shaped in cross section and defining first and second generally "U" shaped sides for receiving in inserting fashion opposing inserting ends of said elongate form structures.

10. The form pattern assembly as described in claim 8, said guide, as viewed in cross section, further comprising first and second spaced and parallel extending surfaces for abutting against oppositely facing surfaces of said form structure, said first and second extending surfaces being interconnected together by assembleable web portions extending therebetween, said web portions defining an end abutting surface between end faces of said form structures.

11. The form pattern assembly as described in claim 1, said concrete filling passageways incorporating rounded interior channels which evenly distribute throughout said form structures loading forces and stresses incurred during the concrete pouring stage.

12. A method for producing a form pattern assembly used in creating a wall structure for receiving a poured concrete, said method comprising the steps of:

extruding an elongate form structure having a substantially rectangular configuration with a height, a length and a width, said extrusion including a plurality of spaced apart, parallel extending and elongated concrete filling passageways defined by interiorly and arcuately extruded walls extending axially along said length, said extrusion further including the formation of interlocking means upon first and second sides of said form structure and along first and second oppositely facing surfaces defining therebetween said height of said form structure;

cutting said elongate form structure into desired lengths;

forming within said height of said form structure, in a perpendicular direction relative to said plurality of extending and concrete filling passageways, a further plurality of concrete filling passageways which interconnect with said initial plurality of passageways; and packaging and shipping said individual form structures.

13. The method as described in claim 12, further comprising the step of assembling, in a specified stacking arrangement, a plurality of said form structures so that said initially extending passageways and said perpendicularly extending passageways extend continuously throughout said stacking arrangement.

14. The method as described in claim 13, further comprising the step of forming, within said height of each of said form structures, a plurality of cavities proximate to said first and second sides and at spaced relation with respect to said further plurality of concrete filling passageways, said cavities aligning along said assembled and stacking arrangement such that they are capable of receiving in inserting fashion a fastener engageable and elongated insert for subsequent attachment of a wall covering surface.

15. The method as described in claim 13, further comprising the steps of forming a substantially "U" shaped recess within and extending along a selected outwardly facing surface of each of said form structures and securing upon an upwardly facing shoulder surface of said recess an elongate brick ledge insert including, in cross section, a first leg and a second angularly extending leg, and suitable for being filled by cement to provide a level and brick ledge surface.

16. The method as described in claim 13, further comprising the step of securing against a selected side or sides of each of said form structures a plurality of elongated and plasticized strips of material at spaced apart intervals for facilitating subsequent attachment of wall covering surface.

17. An interlocking and insulating form pattern assembly used in creating a wall structure for receiving a poured concrete, said form pattern assembly comprising:

a first elongate form structure having a substantially rectangular configuration with a height, a length and a width, said first form structure further including a plurality of interiorly and arcuately formed walls which define in combination a first plurality of vertically spaced and parallel extending concrete filling passageways and a second plurality of longitudinally spaced and parallel extending concrete filling passageways which interconnect with said first plurality of vertically extending passageways;

interlocking means for securing said first form structure in aligned fashion to at least one additional form structure according to a specified stacking arrangement so that said vertically extending passageways and said longitudinally extending passageways extend continuously throughout said stacking arrangement, said interlocking means including projecting tongue portions extending from first and second sides of each said form structures and at least along selected locations of a first surface, recessed groove portions likewise extending from first and second sides of said form structures and at least along selected locations of a second oppositely facing surface;

a substantially "U" shaped recess formed within and extending along a selected outwardly facing surface of said form structure;

an elongate brick ledge insert including, in cross section, a first leg and a second angularly extending leg, said brick ledge being affixedly secured upon an upwardly facing shoulder surface of said "U" shaped recess and suitable for being filled by cement to provide a level and brick ledge surface; and said stacking arrangement of form structures setting upon a footing and receiving a poured concrete to fill said vertically and longitudinally extending concrete filling passageways of said forms.

18. The form pattern assembly as described in claim 17, further a plurality of individual and horizontally extending brick ledge inserts positioned at varying elevations along successively stackable form structures and accommodating uneven external grading elevations.

19. An interlocking and insulating form pattern assembly used in creating a wall structure for receiving a poured concrete, said form pattern assembly comprising:

a first elongate form structure having a substantially rectangular configuration with a height, a length and a width, said first form structure further including a plurality of interiorly and arcuately formed walls which define in combination a first plurality of vertically spaced and parallel extending concrete filling passageways and a second plurality of longitudinally spaced and parallel extending concrete filling passageways which interconnect with said first plurality of vertically extending passageways;

interlocking means for securing said first form structure in aligned fashion to at least one additional form structure according to a specified stacking arrangement so that said vertically extending passageways and said longitudinally extending passageways extend continuously throughout said stacking arrangement, said interlocking means including projecting tongue portions extending from first and second sides of each said form structures and at least along selected locations of a first surface, recessed groove portions likewise extending from first and second sides of said form structures and at least along selected locations of a second oppositely facing surface;

a guide for securing said first elongate form structure and a further elongate form structure in end-to-end fashion, said guide further comprising an elongate member which is substantially "I" shaped in cross section and defining first and second generally "U" shaped sides for receiving in inserting fashion opposing inserting ends of said elongate form structures; and said stacking arrangement of form structures setting upon a footing and receiving a poured concrete to fill said vertically and longitudinally extending concrete filling passageways of said forms.

20. An interlocking and insulating form pattern assembly used in creating a wall structure for receiving a poured concrete, said form pattern assembly comprising:

a first elongate form structure having a substantially rectangular configuration with a height, a length and a width, said first form structure further including a plurality of interiorly and arcuately formed walls which define in combination a first plurality of vertically spaced and parallel extending concrete filling passageways and a second plurality of longitudinally spaced and parallel extending concrete filling passageways which interconnect with said first plurality of vertically extending passageways;

interlocking means for securing said first form structure in aligned fashion to at least one additional form structure according to a specified stacking arrangement so that said vertically extending passageways and said longitudinally extending passageways extend continuously throughout said stacking arrangement, said inter locking means including projecting tongue portions extending from first and second sides of each said form structures and at least along selected locations of a first surface, recessed groove portions likewise extending from first and second sides of said form structures and at least along selected locations of a second oppositely facing surface;

a guide for securing said first elongate form structure and a further elongate form structure in end-to-end fashion, said guide, as viewed in cross section, further comprising first and second spaced and parallel extending surfaces for abutting against oppositely facing surfaces of said form structure, said first and second extending surfaces being interconnected together by assembleable web portions extending therebetween, said web portions defining an end abutting surface between end faces of said form structures; and said stacking arrangement of form structures setting upon a footing and receiving a poured concrete to fill said vertically and longitudinally extending concrete filling passageways of said forms.

21. The form pattern assembly as described in claim 20, said first extending surface further comprising, in cross section, a first generally "V" shape and said second extending surface further comprising a second generally "V" shape, said abutting ends of said form structures likewise being formed with angled surfaces so as to be received in inserting fashion within opposite sides of said guide.

\* \* \* \* \*